(12) United States Patent
Feit et al.

(10) Patent No.: US 9,176,644 B1
(45) Date of Patent: Nov. 3, 2015

(54) SYSTEM AND METHOD FOR CONCISE DISPLAY OF DISCUSSION THREADS

(75) Inventors: Richard Feit, Boulder, CO (US); Thomas Stamm, Louisville, CO (US)

(73) Assignee: Google Inc., Mountain View, CA (US)

( * ) Notice: Subject to any disclaimer, the term of this patent is extended or adjusted under 35 U.S.C. 154(b) by 548 days.

(21) Appl. No.: 13/113,980

(22) Filed: May 23, 2011

(51) Int. Cl.
*G06F 3/048* (2013.01)
*G06F 3/0482* (2013.01)
*H04L 12/58* (2006.01)

(52) U.S. Cl.
CPC .............. *G06F 3/0482* (2013.01); *H04L 51/16* (2013.01)

(58) Field of Classification Search
CPC ............................... H04L 51/16; G06F 3/0482
USPC ........................................... 715/753; 709/206
See application file for complete search history.

(56) References Cited

U.S. PATENT DOCUMENTS

| | | | | |
|---|---|---|---|---|
| 2002/0070984 A1* | 6/2002 | Newman | ........................ | 345/853 |
| 2002/0073117 A1* | 6/2002 | Newman | ........................ | 707/513 |
| 2008/0313292 A1* | 12/2008 | Forstall et al. | ................ | 709/206 |
| 2009/0106375 A1* | 4/2009 | Carmel et al. | ................ | 709/206 |
| 2010/0211889 A1* | 8/2010 | Durazo et al. | ................ | 715/752 |

OTHER PUBLICATIONS

"Thinking with Type" http://thinkingwith type.com/contents/text/ Copyright 2009 Ellen Lupton.*
"Comment Threading is Here! (Plus Other Cool Comment Settings)", WordPress.com—Just Another WordPress Weblog, Feb. 19, 2009, retreived from <http://en.blog.wordpress.com/2009/02/19/comment-threading-is-here-plus-other-cool-comment-settings/>.

\* cited by examiner

*Primary Examiner* — Sara England
(74) *Attorney, Agent, or Firm* — McDermott Will & Emery LLP (57) ABSTRACT

A process for organizing a series of discussion replies is disclosed, including monitoring a discussion thread for a series of single replies, each subsequent reply in the series responding to an immediately preceding reply. Once the system determines the existence of the series of single replies, the series of single replies is arranged into a single horizontally-aligned block, the block being vertically separated from other replies to the discussion comment that are not in the series of single replies. Thus, the horizontal-space used by the discussion thread is minimized and readability of the discussion thread improved.

16 Claims, 4 Drawing Sheets

SYSTEM AND METHOD FOR CONCISE DISPLAY OF DISCUSSION THREADS

TECHNICAL FIELD

The subject technology relates generally to discussion threads, namely, displaying a discussion thread having multiple replies in a concise manner.

BACKGROUND

A discussion thread is typically organized as a logical tree structure. Users share messages and various content, such as text, graphics, audio/video clips, and the like via, a centralized server. Each discussion thread includes an "initial post" and one or more "reply" posts. The posts may be presented in chronological order beneath the initial post. The term "post" is sometimes referred to by other names, such as "entry", "message", "comment", "reply", and the like, and may generally refer to any specific type of message within a discussion thread. Discussion threads are frequently included in on-line forums, newsgroups, and blogs.

Discussion threads are often voluminous, with multiple users posting short, spontaneous comments that may have little value. Each reply is typically indented from the comment to which it responds. A large string of replies, each replying to a prior reply, may become too large to view on a typical display. In some cases, repetitive back-and-forth horizontal scrolling may be required to read a string of replies, and a user may find it difficult to read the replies while maintaining the overall context of the initial post that instigated the replies. Some discussion systems have sought to limit the number of replies made to a discussion comment, to keep the overall discussion thread readable. For example, some commenting systems allow replies to replies of the initial post, but not to those replies.

SUMMARY

A method for organizing a series of discussion replies is disclosed. In one aspect, the method includes receiving a reply in a discussion thread, determining the reply responds to an immediately preceding reply such as to be included in a series of single replies, and displaying the reply together with the series of single replies as a single horizontally-aligned block of replies. In another aspect, the block of replies may be vertically separated from one or more other replies not associated with the series of single replies. In this manner, the horizontal-space used by the discussion thread is minimized and the ability of a user to read the replies while maintaining the overall context of the original post that instigated the replies is improved.

A machine-readable medium is also disclosed, the machine-readable medium having machine-executable instructions stored thereon, which when executed by a machine or computer cause the machine or computer to perform a method for organizing the series of discussion replies. The system may include one or more processors, and a memory including machine-executable instructions, wherein the machine-executable instructions, when executed by the one or more processors, are operable to generate discussion thread instructions and to provide the discussion thread instructions to a remote computer. When executed, the discussion thread instructions may be operable to monitor a discussion thread for a series of single replies, each subsequent reply in the series responding to an immediately preceding reply, wherein the series originates from a discussion comment. On determining the series of single replies, the series of single replies are arranged into a single horizontally-aligned block, the block being vertically separated from other replies to the discussion comment that are not in the series of single replies. The discussion thread instructions may be further operable to provide the discussion thread to a display including the discussion comment and the single horizontally-aligned block.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In threaded discussions, when a first person replies to a comment in a discussion thread the reply typically is displayed as indented under the discussion thread, and any subsequent reply to the first reply is further indented, and so on. Where there is a large series of replies, the reply chain may grow larger horizontally than can be displayed on a display screen. This forces the user to manually scroll over to view all of the replies. Moreover, several lengthy reply chains intermingled with other responses may clutter the discussion thread and cause confusion when viewing the threaded discussion or attempting to reply to a comment therein. Thus, there is a need for a system that has the ability to organize a series of single replies in a threaded discussion chain.

The subject technology solves the previously described problems by including a system and method for intelligently organizing and displaying a series of discussion replies. When a discussion thread is viewed, an algorithm is performed to determine whether there is a series of single replies to a discussion comment. If the answer is "yes" then the series is grouped together into a single horizontally-aligned block of replies and treated as a single unit of indentation, thus enabling the series to be displayed in a minimal horizontal area. In this regard, further indentation only occurs when there are multiple replies ("branching replies") to the same post. The algorithm may be executed on a server and the grouped discussion replies viewed when the page is rendered on a browser. Alternatively, in some aspects, the algorithm may be executed on the browser and the discussion thread rendered in real time on the client machine.

Figure 1:
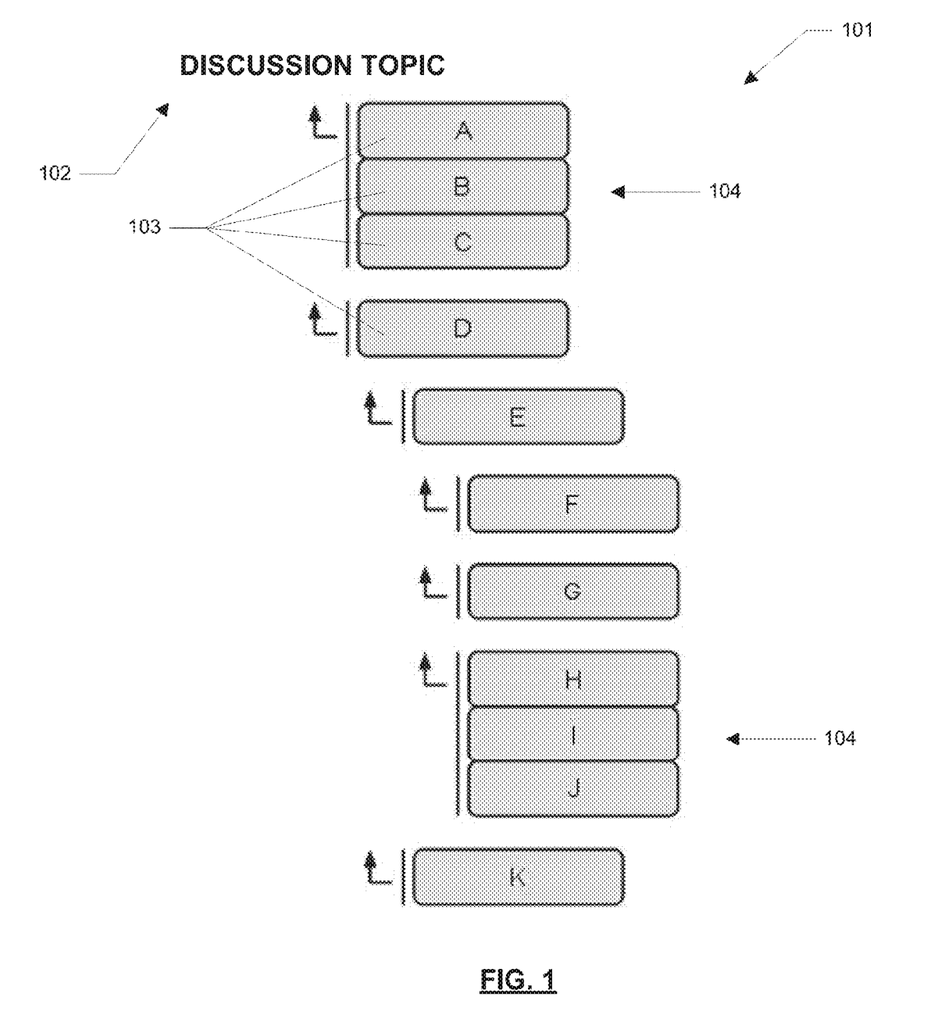
FIG. 1 is an exemplary diagram illustrating the organization of a series of discussion replies according to one aspect of the subject technology.

FIG. 1 is an exemplary diagram illustrating the organization of a series of discussion replies according to one aspect of the subject technology. In the illustrated example, a discussion thread 101 includes a discussion topic 102 and posts 103. Discussion topic 102, for example, may include a comment in the form of text, a group of characters or symbols, one or more graphics or digital photos, an audio or video stream, or any combination thereof. Posts A and D are in reply to a comment (not shown) in a discussion thread. B is in reply to A, and C is in reply to B. E and K are in reply to D. F, G and H are in reply to E, while I is in reply to H and J is in reply to I. B and C, and I and J, are grouped together into a single horizontally-aligned block 104 of replies and treated as a single unit of indentation. Each of the grouped blocks 104 will remain as a single unit until one of the replies therein receives a second reply. For example, if post L is made in reply to I then I, J, and L will separate from H, and become a single unit indented to the right and underneath H.

In one aspect, programming code for organizing a discussion thread may be created using a scripting language and/or object-oriented code (for example, Java and/or JavaScript). For example, the programming code may include a function for formatting the replies (for example, "formatReplies") that formats a set of message replies and adds them to a container (for example, a data structure of thread widgets that is configured to be displayed as part of a user interface). If there is only one reply, the code may add it to the container directly. Otherwise, a new branch container may be created, and replies will be added (for example, recursively) to the container. In one aspect, a view may be included (for example, a "parentMessageView") which will programmatically create a view in the display for viewing the posted messages/replys and/or the container including the same. A factory class may be used to generate the message view (for example, a "messageViewFactory").

In some aspects, the system may keep track of the last time a user read a topic. For example, the code may include a variable (for example, "lastReadTime") to store the last time the user read the topic and/or discussion thread. If null, everything may be expanded; otherwise the branches of the tree that have already been entirely read may be collapsed. In one aspect, branches may be collapsed as close to the root of the tree as possible so it isn't necessary to programmatically un-collapse all the way down to the furthest leaf. In this regard, a variable may be included to determine whether a parent node in the tree is collapsed (for example, "parentCollapsed"). If, for example, the value is set to TRUE, the present node and corresponding child nodes may not be collapsed. Another variable may be included for determining whether the present node is a first level of a tree (for example, "topLevel"). A further variable may determine whether the present node is a last branch (for example, "lastBranch") in a tree (from the top level) and/or whether any node in the tree has been expanded. This may ensure that the present branch remains expanded (for example, so the bottom-most message can be viewed). Another variable may determine whether any branches in the tree have been expanded (for example, "anythingExpanded"). In one aspect, a branch may be collapsed if another branch is expanded or it is not the last branch, and if nothing in the branch is newer than a predetermined time (for example, the present time), and a previous branch (for example, a parent branch) isn't collapsed.

Below is a exemplary listing of a java class for formatting replies of a discussion thread according to one aspect of the subject technology. The following programming code is not inclusive, but, rather is merely representative of one of several algorithms that may be used with the subject technology. By viewing the following listing, one skilled in the art will recognize that there may be various configurations of programming code that may be written and/or executed by a computer and/or processor to carryout features of the subject technology.

```
private void formatReplies(MessageView parentMessageView,
    @Nullable List<ClientBasicMessage> replies,
    HasWidgets container,
    MessageViewFactory messageViewFactory,
    @Nullable Instant lastReadTime,
    boolean parentCollapsed,
    boolean topLevel,
    boolean lastBranch,
    boolean anythingExpanded,
    TopicStructureHelper topicStructureHelper) {
    if (replies==null) {
        return;
    }
    List<ClientBasicMessage> fullReplies;
    if (commentsEnabled) {
        List<ClientBasicMessage>
            comments=Lists.newArrayList( );
        fullReplies=Lists.newArrayList( );
        for (ClientBasicMessage m: replies) {
            if (m.getClientBasicMessageMetadata(  ).isComment( )) {comments.add(m);
            }else {
                fullReplies.add(m);
            }
        }
        for (ClientBasicMessage comment: comments) {
            parentMessageView.addComment(comment);
        }
    }else {
        fullReplies=replies;
    }
    boolean branch=fullReplies.size( )>1;
    int i=0;
    for (ClientBasicMessage reply: fullReplies) {
        if (topLevel && ++i==fullReplies.size( )) {
            lastBranch=true;
        }
        HasWidgets contentPanel=container;
        MessageView
            messageView=messageViewFactory.createMessageView(reply);
        TopicBranchContainer branchContainer=null;
        boolean branchMessagesOlder=false;
        if (branch) {
```

```
    branchContainer=branchContainerProvider.get( );
    contentPanel.add(branchContainer);
    contentPanel=branchContainer;
    ClientBasicMessageMetadata
        messageMetadata=reply.getClientBasicMessageMetadata(
        );
    branchContainer.setTopicInfo(messageMetadata.getFo-
rumName( ),
    messageMetadata.getTopicId( ));
    branchMessagesOlder=lastReadTime !=null && topic-
        StructureHelper.areAllChildrenRead(reply, lastRead-
        Time);
    }
    boolean collapse=(anythingExpanded || !lastBranch) &&
        branch && branchMessagesOlder && !parentCol-
        lapsed &&
!reply.getClientBasicMessageMetadata( ).isFavoriteReply(
);
    anythingExpanded=anythingExpanded ||!collapse;
    contentPanel.add(messageView);
    formatReplies(messageView,
        topicStructureHelper.getReplies(reply),
        contentPanel, messageViewFactory, lastReadTime,
            parentCollapsed ||collapse,
        false,
        lastBranch,
        anythingExpanded,
        topicStructureHelper);
    if (autoCollapseEnabled && collapse) {
        branchContainer.setSuperCollapsedState(true);
    }
    }
    }
}
```

In some aspects, a grouped series of replies may include a symbol (for example, a character or graphic representative of a plus or minus sign) to collapse and expand the series. For example, clicking a first time on the symbol may cause all the grouped replies to disappear. Clicking a second time may cause the grouped replies to collapse to a summary (for example, each represented by a single line). Clicking a third time may expand the group, and so on. In other aspects, the system may capture the point in time when the grouped series was last viewed. If the grouped series is collapsed and then later expanded, the replies in the group that were viewed at the captured point in time may default to a single line summary, while newer replies are displayed as fully expanded.

Figure 2:
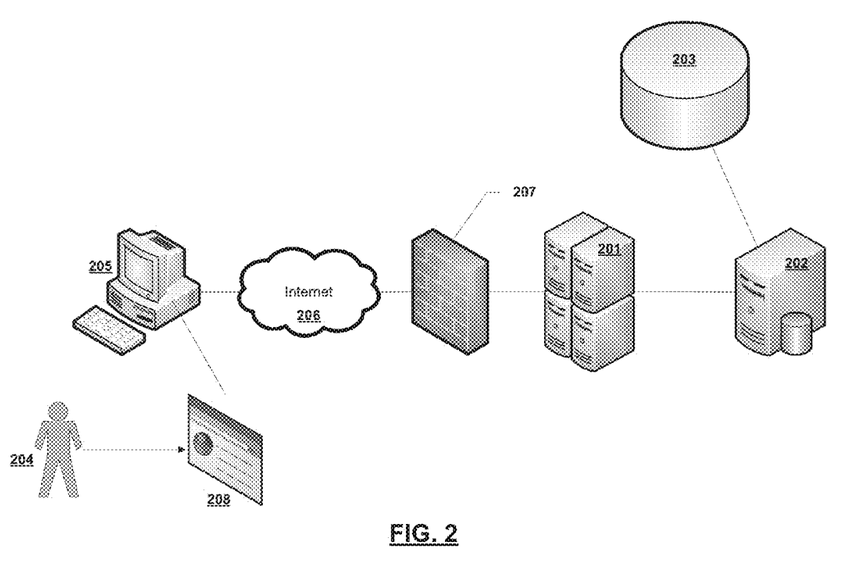
FIG. 2 is an exemplary diagram illustrating server and database components of a system for organizing a series of discussion replies according to one aspect of the subject technology.

FIG. 2 is an exemplary diagram illustrating server and database components of a system for organizing a series of discussion replies according to one aspect of the subject technology. A system compatible with the subject technology includes one or more servers 201 and a database server 202 for the storing discussion thread data in a database 203. A user 204 may use a computer 205 (for example a personal computer, PDA, Smartphone or the like) to connect to one or more servers 201 via a network 206 (for example, the Internet, LAN/WAN, or the like) to read and/or to post to a discussion thread. In some aspects, a firewall 207 may exist between network 206 and the one or more servers 201. User 204 may interact with a user interface 208 (for example, web page, presentation layer, or other screen), which is presented to computer (and/or display) 205 by the one or more servers 201, and having controls (for example, drop down lists, selection choices, text inputs or the like) for entering comments and/or replies to a discussion topic.

In one aspect, one or more servers 201 are operable to receive user-generated data (for example, text, graphics, audio/video, one or more links, or the like) from user interface 208 (for example, via a form POST or QUERY command). One or more servers 201 may be operable to associate the user-generated data with one or more other posts (for example, a discussion topic or reply thereto). One or more servers 201 may then transmit the user-generated data to database server 202 for storage on database 203. In some aspects, user 204 may not be a person, but, rather, may be an external system (for example, another server or computer system) and user interface 208 may include a web-service or like interface for receiving data from external system 204.

Figure 3:
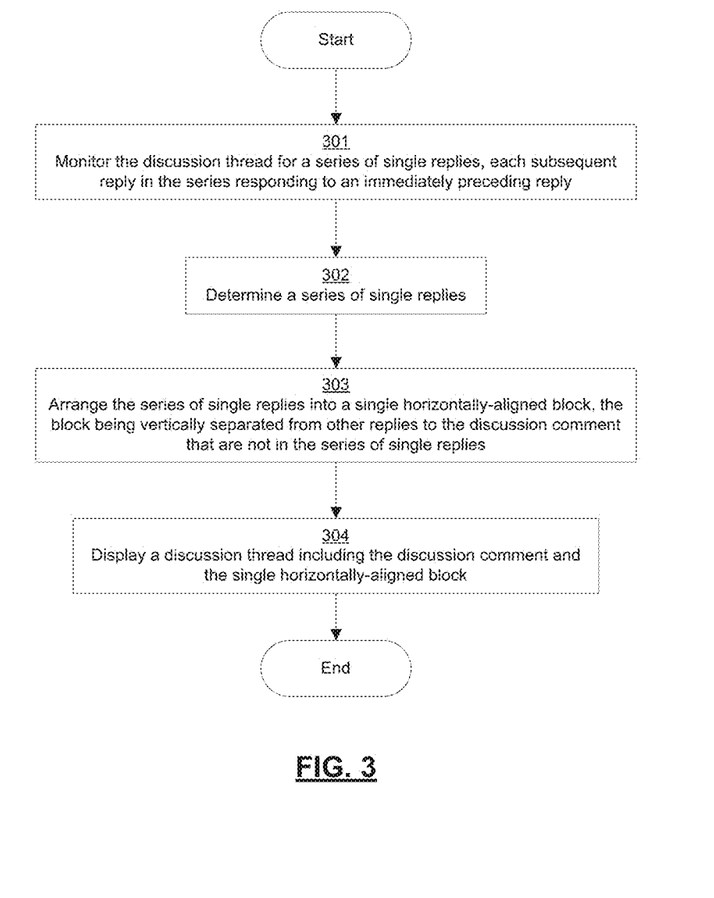
FIG. 3 is a flowchart illustrating a process for organizing a series of discussion replies according to one aspect of the subject technology.

FIG. 3 is a flowchart illustrating a process for organizing a series of discussion replies according to one aspect of the subject technology. In a first process 301, a discussion thread is monitored on a first computer for a series of single replies. In one aspect, a series of single replies includes each subsequent reply in the series responding to an immediately preceding reply, all replies in the series originating from a discussion comment. A reply may be posted in reply to the discussion topic, a discussion comment, or, in some aspects, as part of another reply. In process 302, the system determines the existence (and logical location) of the series of single replies. In process 303, once the system determines the existence (and/or logical location) of the series of single replies, the series of single replies are arranged into a single horizontally-aligned block, the block being vertically separated from other replies to the discussion comment that are not in the series of single replies. In process 304, the discussion thread is displayed on display 205. In one aspect, the single horizontally-aligned block may be displayed with the discussion comment. In another aspect, the single horizontally-aligned block may be displayed as vertically separated from the discussion comment and/or indented to the right underneath the discussion comment.

In one example, a computer system (for example, one or more servers 201 of FIG. 2) may include a memory having machine-executable instructions stored thereon, which when executed by a machine or computer cause the machine or computer to render user interface 208, including a discussion thread, on display 205. The system may also include one or more processors (for example, processor 401 of FIG. 4) operable to receive data from user interface 208, execute the machine-executable instructions, and read and write to the memory. In this regard, the one or more processors may be operable to execute the processes illustrated by FIG. 3.

In other aspects, a symbol (for example, a text, character, and/or graphic) may be displayed on display 205 (or the presentation interface) in connection with the series of single replies, and one or more signals may be received that are representative of one or more mouse clicks on the symbol. On the one or more processors receiving a first signal representative of a first mouse click the series of replies may be collapsed. On receiving a second signal representative of a second mouse click each reply in the series of replies may be reduced to a summary line on the display. And, on receiving a third signal representative of a third mouse click the series of replies may be expanded. The summary line may include a line of text, or, in some aspects, may include one or more graphics, limited by a predetermined pixel height. In other aspects, one or more servers 201 may capture a first point in time representative of when the series of single replies was last viewed and/or presented as part of user interface 208. In this regard, expanding the series of single replies on a third mouse click may include expanding some replies that were not viewed prior to the first point in time while not expanding the replies that were viewed during the first point in time. In one aspect, not expanding the previously viewed replies may include each of those replies being represented by a summary line, previously described.

Figure 4:
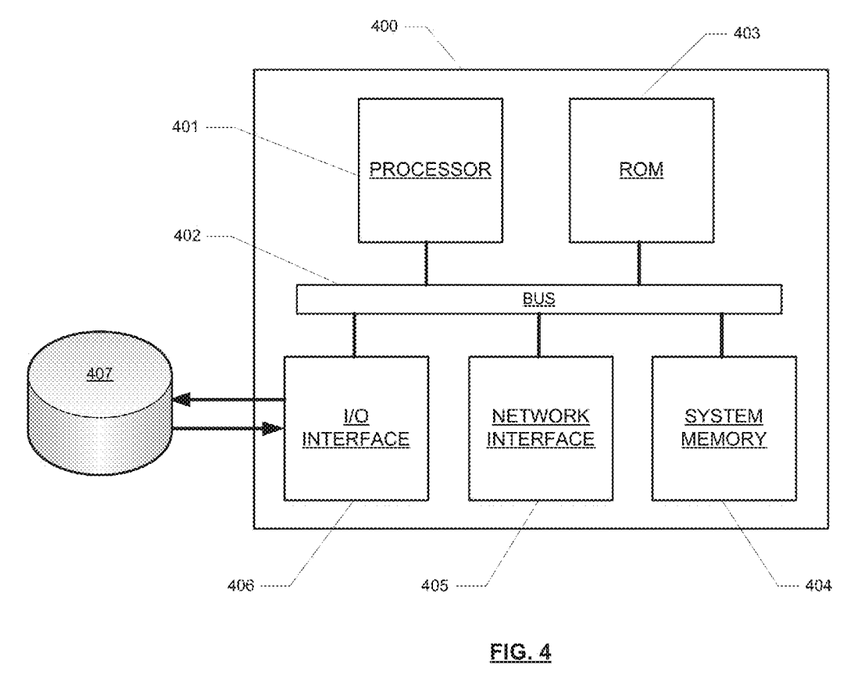
FIG. 4 is a diagram illustrating an exemplary server system for dynamically organizing a series of discussion replies, including a processor and other internal components, according to one aspect of the subject technology.

FIG. 4 is a diagram illustrating an exemplary server system for dynamically organizing a series of discussion replies, including a processor and other internal components, according to one aspect of the subject technology. As depicted in FIG. 4, in some aspects, server 400 (for example, one or more servers 201, and/or database server 202) includes several internal components such as a processor 401, a system bus 402, read-only memory 403, system memory 404, network interface 405, I/O interface 406, and the like. In one aspect, processor 401 may also be communication with a storage medium 407 (for example, a hard drive) via I/O interface 406. In some aspects, all of these elements of server 400 may be integrated into a single server. In other aspects, these elements may be configured as separate components.

Processor 401 may be operable to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like. Alternatively, one or more external devices may include an electronic device such as a digital camera, a digital audio player, a digital video recorder, and the like.

In some aspects, system memory 404 represents volatile memory used to temporarily store data and information used to manage server 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of server 400, those skilled in the art will recognize that system memory 504 may be separate from server 500 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer implemented method of displaying a discussion thread, comprising:
   detecting, in the discussion thread, a first group of replies organized such that a first reply of the first group is posted in response to a message posted to the discussion thread, and each remaining reply of the first group responds to an immediately preceding reply;
   determining a point in time when the first group of replies was last presented for display;
   detecting, in the discussion thread, a second group of replies, a first reply of the second group posted in response to the message;
   providing for display each group of replies in the discussion thread as a horizontally-aligned block of replies, the first and second groups being vertically separated from each other under the message; and
   displaying as a summary line of a predetermined height each reply in the first group that was presented with the first group at the point in time while displaying in an expanded state one or more replies created for the first group after the point in time.

2. The computer implemented method of claim 1, the method further comprising:
   on receiving a selection associated with the first group of replies, determining a type of the selection, and removing the first group of replies from display on a first selection, collapsing each reply in the first group of replies to a summary line on a second selection, and expanding the first group of replies on a third selection.

3. The computer implemented method of claim 2, the method further comprising:
   displaying a symbol associated with the first group of replies, wherein a selection associated with the first group of replies includes receiving a signal representative of a mouse click at the symbol.

4. The computer implemented method of claim 1, the method further comprising:
   receiving selection for collapsing the first group of replies; and
   displaying the first group without the replies in the first group that are displayed as a summary line of a predetermined height.

5. The computer implemented method of claim 1, the method further comprising:
   receiving selection for expanding the currently displayed first block; and
   in response to receiving the selection, expanding each displayed summary line of the predetermined height to display each reply in the first group in the expanded state.

6. A system for organizing a series of discussion replies, comprising:
   one or more processors; and
   a memory including machine-executable instructions, wherein the machine-executable instructions, when executed by the one or more processors, are operable to:
   generate discussion thread instructions that, when executed, are operable to:
      monitor a discussion thread for one or more series of single replies, each subsequent reply in a respective series responding to an immediately preceding reply in the respective series, wherein the one or more series originate from a discussion comment,
      determine a point in time when each series of single replies was last presented for display;
      when providing two or more of the one or more series of single replies for display, arrange each of the two or more series of single replies into a single horizontally-aligned block, the horizontally-aligned blocks being vertically separated from each other under the discussion comment, and
      provide the discussion thread to a display including the discussion comment and the horizontally-aligned blocks,
      wherein, for a respective series of single replies, each reply in the respective series that was presented with the respective series at the determined point in time for the respective series is displayed as a summary line of a predetermined height while one or more replies created for the respective series after the determined point in time are displayed in an expanded state; and provide the discussion thread instructions to a remote computer.

7. The system of claim 6, the discussion thread instructions are further operable to:

provide to the display, a symbol in connection with each series of single replies; and receive one or more signals representative of one or more mouse clicks on a symbol, wherein on receiving a first signal representative of a first mouse click the one or more processors are operable provide a corresponding series of replies to the display in a collapsed format, on receiving a second signal representative of a second mouse click the one or more processors are operable to provide each reply in the corresponding series of replies to the display in a summary line format, and on receiving a third signal representative of a third mouse click the one or more processors are operable to provide to the display the corresponding series of replies in an expanded format.

8. A non-transitory machine-readable medium having machine-executable instructions stored thereon, which when executed by a machine or computer cause the machine or computer to perform a method of organizing a series of discussion replies, comprising:

receiving a plurality of replies in response to a comment posted to a discussion thread;

determining a first group of two or more replies from the plurality of replies, with a first reply of the first group posted in response to the comment, and each remaining reply of the first group posted in response to another reply of the first group;

determining a point in time when the first group of two or more replies was last presented for display;

determining a second group of replies from the plurality of replies, a first reply of the second group posted in response to the comment;

providing the first and second groups for display as respective vertically separated blocks of replies under the comment; and displaying as a summary line of a predetermined height each reply in the first group that was presented with the first group at the point in time while displaying in an expanded state one or more replies created for the first group after the point in time.

9. The non-transitory machine-readable medium of claim 8, the method further comprising:

on receiving a first selection associated with a selected block of replies, not displaying the selected block of replies.

10. The non-transitory machine-readable medium of claim 9, the method further comprising:

on receiving a second selection associated with the selected block of replies, collapsing each reply in the selected block of replies to a summary line.

11. The non-transitory machine-readable medium of claim 10, the method further comprising:

on receiving a third selection associated with the selected block of replies, displaying the selected block of replies.

12. The non-transitory machine-readable medium of claim 11, the method further comprising:

displaying a symbol associated with the selected block of replies, wherein a selection associated with the selected block of replies includes receiving a signal representative of a mouse click at the symbol.

13. The non-transitory machine-readable medium of claim 8, the method further comprising:

receiving selection for collapsing the first group of two or more replies; and displaying the first group without the replies in the first group that are displayed as a summary line of a predetermined height.

14. The non-transitory machine-readable medium of claim 8, the method further comprising:

receiving selection for expanding the currently displayed first block; and in response to receiving the selection, expanding each displayed summary line of the predetermined height to display each reply in the first group in the expanded state.

15. The non-transitory machine-readable medium of claim 8, wherein the vertically separated blocks are displayed horizontally-aligned with each other.

16. The non-transitory machine-readable medium of claim 8, wherein the second group comprises two or more replies from the plurality of replies, with all but the one reply posted in response to another reply of the second group.

\* \* \* \* \*